United States Patent [19]
Weinhart et al.

[11] Patent Number: 5,638,720
[45] Date of Patent: Jun. 17, 1997

[54] VEHICLE TRANSMISSION SHIFTING SYSTEM VIBRATION DAMPING ARRANGEMENT

[75] Inventors: Armin Weinhart, Ebersberg; Peter Streng; Bernhard Rastinger, both of Munich, all of Germany

[73] Assignee: Bayerische Motoren Werke Aktiengesellschaft, Germany

[21] Appl. No.: 435,964

[22] Filed: May 5, 1995

[30] Foreign Application Priority Data

May 5, 1994 [DE] Germany .......................... 44 15 921.8

[51] Int. Cl.⁶ ........................... F16H 59/04; G05G 7/16
[52] U.S. Cl. ........................................ 74/473 R; 403/225
[58] Field of Search ...................... 74/473 R; 403/220, 403/225, 226, 228; 464/128, 132, 70

[56] References Cited

U.S. PATENT DOCUMENTS

| | | | |
|---|---|---|---|
| 1,778,503 | 10/1930 | Lord | 403/228 |
| 2,198,780 | 4/1940 | MacPherson | 403/228 |
| 3,064,493 | 11/1962 | Popovich et al. | 74/473 R |
| 4,520,686 | 6/1985 | Renk | 74/473 R |
| 4,777,839 | 10/1988 | Lindholm et al. | 74/473 R |
| 4,872,361 | 10/1989 | Müller | 74/473 R |
| 5,100,114 | 3/1992 | Reuter et al. | 403/225 X |
| 5,136,893 | 8/1992 | Wilhelmy | 74/473 R |
| 5,218,880 | 6/1993 | Mizutani | 74/473 R |

FOREIGN PATENT DOCUMENTS

| | | |
|---|---|---|
| 1 158 378 | 11/1963 | Germany . |
| 1 935 048 | 5/1971 | Germany . |
| 2 022 723 | 11/1971 | Germany . |
| 31 01 671 A1 | 8/1982 | Germany . |
| 36 34 174 A1 | 4/1987 | Germany . |
| 41 00 574 A1 | 7/1991 | Germany . |
| 42 04 379 A1 | 8/1993 | Germany . |

*Primary Examiner*—Andrea L. Pitts
*Assistant Examiner*—Troy Grabow
*Attorney, Agent, or Firm*—Evenson, McKeown, Edwards & Lenahan, P.L.L.C.

[57] ABSTRACT

An arrangement for damping vibrations in a vehicle transmission shifting system in which the shift rod between the gear shift lever and the shifting transmission is divided into two parts. The two partial sections are connected with one another by way of a hinge and a support bearing. The support bearing has play and is provided with an elastic layer to effectively dampen vibrations occurring perpendicularly with respect to the longitudinal axis of the rod.

3 Claims, 1 Drawing Sheet

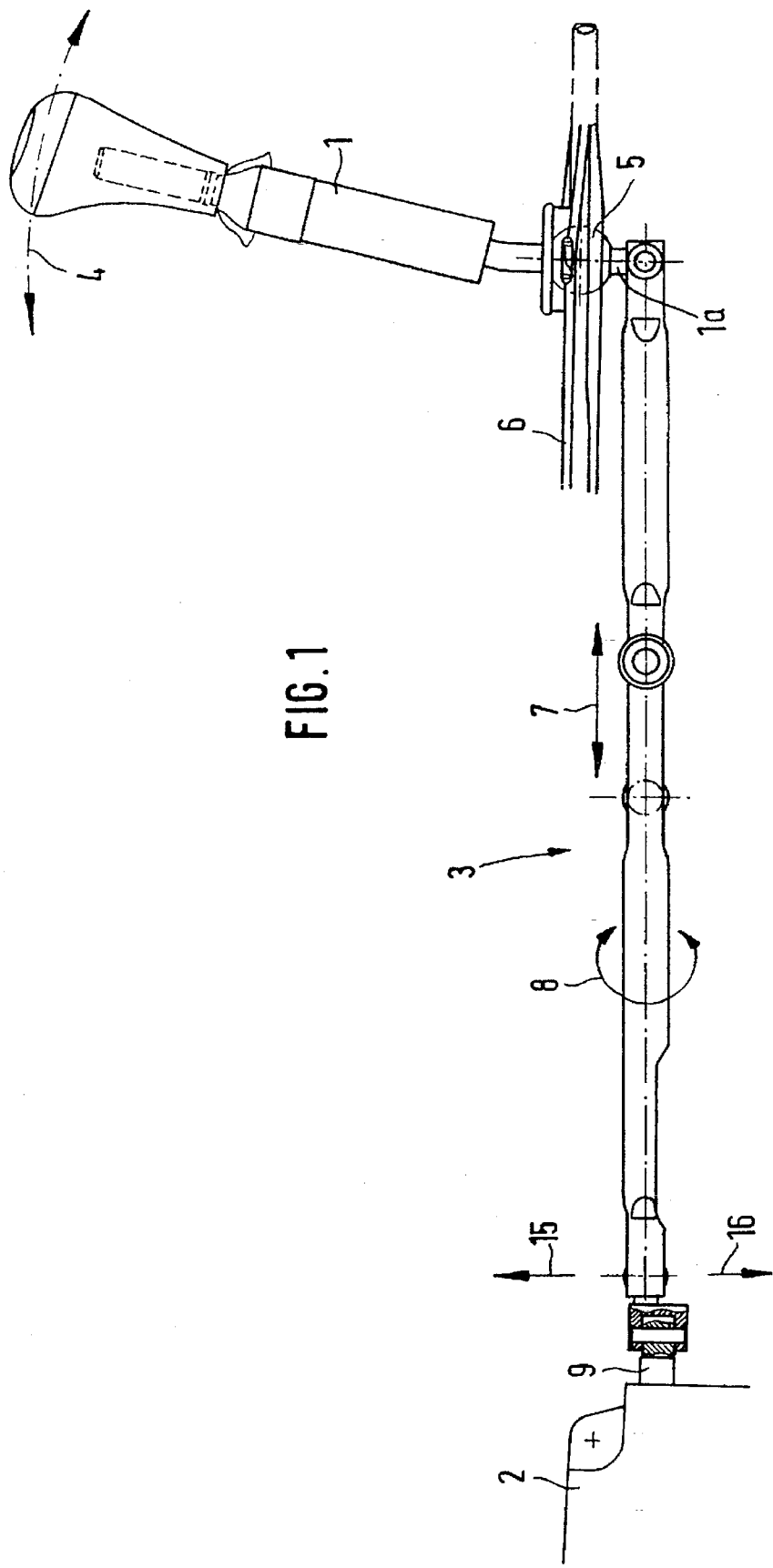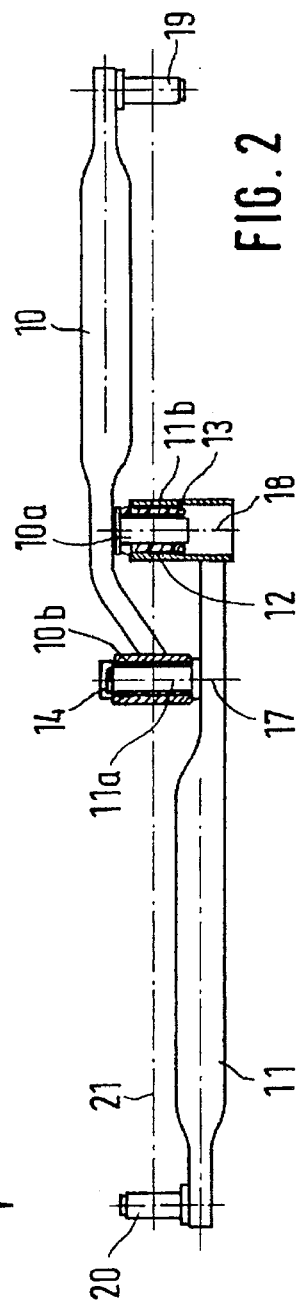

5,638,720

VEHICLE TRANSMISSION SHIFTING SYSTEM VIBRATION DAMPING ARRANGEMENT

BACKGROUND AND SUMMARY THE INVENTION

The present invention relates to an arrangement for damping vibrations in a transmission shifting system for vehicles, and more particularly, to an arrangement comprising a shift rod arranged in the vehicle in a rotatable and axially movable manner and adjustable by a manually operable shift lever and, in an axial direction thereof, comprises at least two rod sections connected by a joint permitting rotating and axial movements of the shift rod.

In transmission shifting systems, engine-excited oscillations introduce vibrations via the outside shifting device, thus particularly the shift rod, into the gear shift lever. When the shifting device on the shift lever head is operated, the high-frequency component of these vibrations generates an unpleasant and disturbing shifting sensation. It was found that the vibrations are caused mainly by the vibration components in the longitudinal direction of the shift lever.

DE-A-36 34 174 shows a system for damping such vibrations. The shift rod situated between the gear shift lever and the transmission is divided into two parts by a universal joint. The two rod sections are connected by the joint such that the shift rod can carry out rotational and axial movements. In order to dampen or uncouple the vibrations occurring radially about the longitudinal axis of the shift rod and resulting from the engine transmission unit, spring elements, preferably O-rings, are provided on each rod section. The spring elements are enclosed by a stiff connection member which, in turn, is separated from the shifting rod sections. However, the known arrangement requires relatively high expenditures.

It is, therefore, an object of the present invention to provide a simpler vibration damping arrangement. This object has been achieved in accordance with the present invention by providing that the joint is a hinge with an axis of rotation extending perpendicularly to the axial direction of the shift rod, the at least two rod sections are connected with one another by way of a support bearing having a predetermined play, and a bearing axis of the support bearing extends parallel to the axis of rotation of the hinge.

In contrast to the prior art, the present invention utilizes only a hinge to which a support bearing is assigned. The hinge and the support bearing can be constructed in a simple manner by pins and sleeves which are fastened to the respective rod sections by, for example, welding.

As mentioned above, particularly vibrations which are introduced in a multi-axial manner have a disturbing effect on the shift lever. The divided shift rod of the arrangement according to the present invention is correspondingly capable of preferably damping these vibration components. If, in addition to the support bearing, a certain play is also permitted in the case of the hinge, it is now possible to also dampen to a certain degree the vibration component which occurs perpendicularly thereto. However, in this situation, the shifting will result in a somewhat softer, doughy shifting sensation.

In order to avoid noise problems, it is also an advantageous feature of the present invention to fill the clearance formed by the play at least partially with an elastic layer. In addition, the elasticity of the layer improves the damping of the vibrations.

On the whole, the arrangement according to the present invention provides a precise shifting sensation and largely prevents the disturbing vibration of the shift lever.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a plan view of an arrangement according to the present invention comprising a gear shift lever, a shift rod and an outlined transmission case; and FIG. 2 is a top view of the shift rod according to FIG. 1.

DETAILED DESCRIPTION OF THE DRAWINGS

The arrangement according to the present invention for a vehicle comprises a shift lever 1, a known type of manual transmission 2 and a shift rod which is situated between the shift lever 1 and the manual transmission 2 and, is designated generally by reference numeral 3. The shift lever 1 can be moved in the direction of a double arrow 4 in the driving direction to the front and to the rear, i.e., the plane of the drawing. In addition, it may be operated vertically thereto which, however, is not shown in FIG. 1. This degrees-of-freedom mobility of the shift lever 1 is provided by a ball bearing 5 in a bottom section 6 of a schematically shown vehicle body.

A lower end 1a of the shift lever 1 is hinged to the shift rod 3 so that the shift rod 3 goes along with the movements of the shift lever 1. That is, the shift rod 3 can be axially displaced as illustrated by the double arrow 7 and rotated about its axis as indicated by double arrow 8.

The end of the shift rod 3 situated opposite the shift lever 1, in turn, is hinged to a shift member 9 which leads into the interior of the transmission 2 and essentially operates the shift forks (not shown), and therefore causes the engaging of the gears in a known manner.

The construction of the shift rod 3 is illustrated in detail in FIG. 2. It comprises two rod sections 10, 11 which are connected with one another with the ends of their one side while the ends of the other side have journals 19, 20 for the respective hinged connection to the shift lever end 1a and the shift member 9.

Furthermore, a sleeve and a pin are fastened to each rod section 10, 11, specifically in the area of the end which is connected with the other rod section. The sleeves are arranged on the extreme axial end and the pins are arranged at a distance thereto. Both parts, thus the pins and the sleeves, project radially with respect to the rod axis and point in the same direction. Their longitudinal axes therefore extend in parallel to one another. In rod section 10, the sleeve situated on the extreme end has the reference numeral 10b, while the pin has the reference numeral 10a. Correspondingly, in rod section 11, the pin has the reference numeral 11a and the sleeve has the reference numeral 11b.

Rod sections 10, 11 are fitted together and thus result in the shift rod. For this purpose, the sleeve 10b and the pin 11a form a hinge with an axis of rotation 17 which extends perpendicularly with respect to the longitudinal axes of the rod section. On the other hand, the sleeve 11b and the pin 10a, together, form an abutment whose bearing axis 18 also extends perpendicularly to the shift rod axes and parallel to the hinge axis 17.

Play is provided between the pin 10a and the sleeve 11b. A portion of the clearance resulting from the play is taken up by an elastic layer 12 which surrounds the pin 10a as a collar. Elastic O-rings 13 secure the collar in the axial direction. Alternatively, the elastic layer 12 may completely fill the clearance. A spring clip 14 which is pushed into a ring-groove of the end of the pin 11 projecting out of the sleeve 10b, secures the two rod halves 11 and 10 in their mounted position.

Rod section 10 is bent on its end facing rod section 11 so that the actual longitudinal axes of the rod sections 10, 11 extend at a distance in parallel to one another. The connecting journals 19, 20 for the shift-lever-side and transmission-side linking point in the opposite directions so that the assembled shift rod can be installed in the vehicle so that its imaginary longitudinal axis 21 extends through the center of the shift-lever-side and transmission-side joints as well as through the center of the hinge and of the support bearing, thereby avoiding a twisting of the shift rod 3 during its operation.

The shift rod 3 consisting of shift rod sections 10, 11 permits an effective damping of the vibrations, as illustrated in FIG. 1, by way of arrows 15 and 16, thereby keeping these vibrations away from the shift lever 1. As a result of the play in the support bearing 10a, 11b the rod section 11 can be moved to a limited extent in the direction of the arrows 15, 16 and is damped in its movement by the intermediate layer 12. By way of the hinge 11a, 10b, the movements can be transmitted in the direction of the double arrow 7 and of the arrow 8 to the transmission input part 9 without any play. During these movements, the support bearing 10a, 11b prevents a buckling of the two rod sections 10, 11.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement for damping vibrations in a transmission shifting system for a vehicle, comprising a shift rod arranged in the vehicle in a rotatable and axially movable manner and adjustable by a manually operable shift lever and, in an axial direction thereof, comprises at least two rod sections connected by a hinge permitting undampened rotating and axial movements of the shift rod, wherein the hinge has an axis of rotation extending perpendicularly to the axial direction of the shift rod, the at least two rod sections are further connected with one another by way of a support bearing so as to prevent relative movement between the at least two rods section in the axial and rotational directions, and a bearing axis of the support bearing extends parallel to the hinge axis of rotation with the shift rod being configured to dampen vibrations in a plane located in the axial direction and perpendicular to the hinge axis of rotation resulting from relative movement of the at least two rod sections about the hinge axis of rotation.

2. The arrangement according to claim 1, wherein one sleeve and one pin respectively are axially spaced on each of the at least two rod sections and extend radially in the same direction, the pin of one rod section engaging in each sleeve of another rod section, and the sleeve of the one rod section, together with the pin of another rod section forming the hinge, and the pin of the one rod section, together with the sleeve of another rod section, forming the support bearing.

3. The arrangement according to claim 2, wherein an elastic intermediate layer is provided between the pin of the support bearing and the associated sleeve.

* * * * *